Feb. 23, 1926.  
W. GROENEBAUM  
1,574,286  
CLUTCH MECHANISM FOR SOUND REPRODUCING MACHINES AND THE LIKE  
Filed Jan. 3, 1925
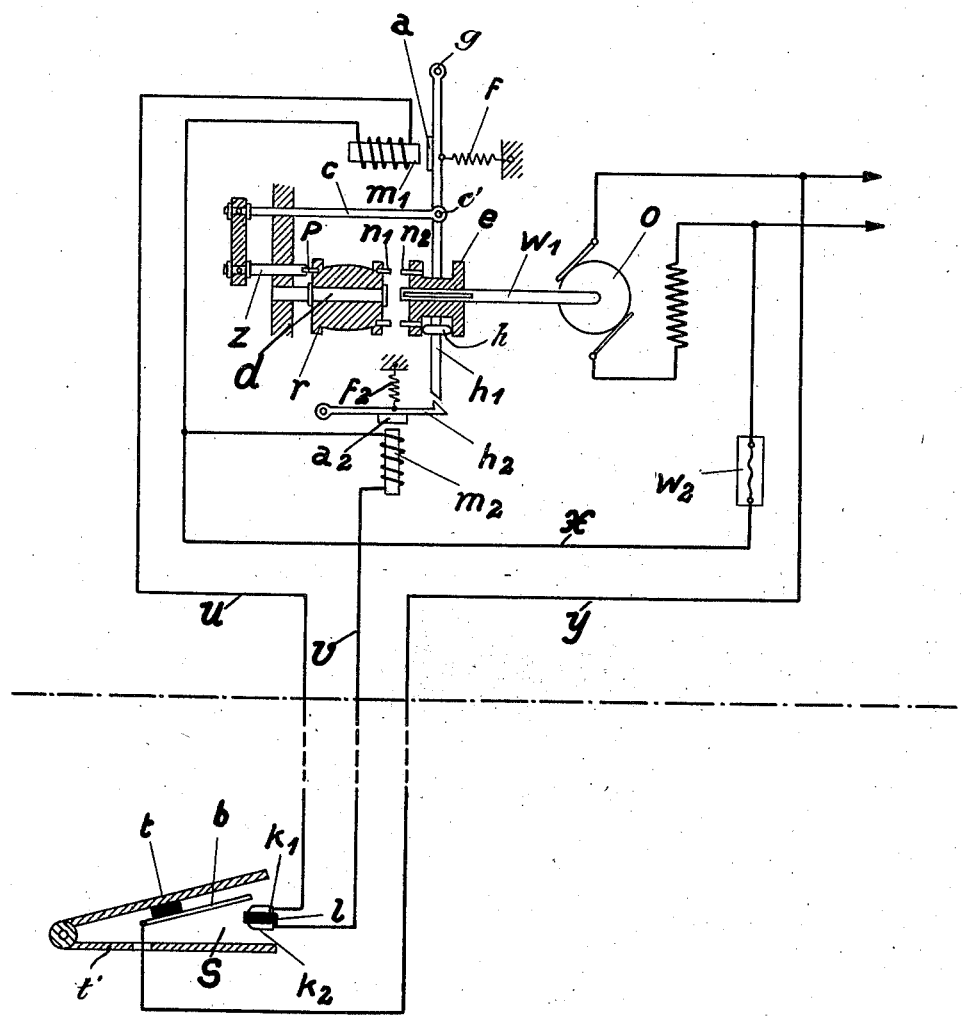
Inventor:  
Wilhelm Groenebaum  
by Lotka, Schlenbeck & Farley  
Attorneys.

Patented Feb. 23, 1926.

1,574,286

UNITED STATES PATENT OFFICE.

WILHELM GROENEBAUM, OF NEU-BABELSBERG, NEAR BERLIN, GERMANY, ASSIGNOR TO THE FIRM NAAMLOOZE VENNOOTSCHAP FINANCIEELE MAATSCHAPPIJ "DRIEBERGEN," OF AMSTERDAM, NETHERLANDS.

CLUTCH MECHANISM FOR SOUND-REPRODUCING MACHINES AND THE LIKE.

Application filed January 3, 1925. Serial No. 328.

*To all whom it may concern:*

Be it known that I, WILHELM GROENEBAUM, a citizen of the German Empire, residing at Neu-Babelsberg, near Berlin, Germany, have invented certain new and useful Improvements in Clutch Mechanisms for Sound-Reproducing Machines and the like (for which I have filed an application in Germany on November 12, 1923), of which the following is a specification.

This invention relates to clutch mechanisms for sound reproducing machines and the like and particularly for talking machines, dictation recording and reproducing machines, and telephonographs. The primary object of the invention is to provide clutch engaging means between the driving motor and the record carrier for instantly stopping the sound wave record (disk, cylinder, steel band etc.) and for immediately starting the record at full speed so as to obtain a faithful reproduction of the speech impressed on the record. This object is attained by providing a driving member, such as an electric or spring motor, that continually rotates at a constant speed, and arranging the driving pulley or toothed wheel of the record carrier to be coupled with, and uncoupled from, the driving member by means of a clutch. The belt pulley or toothed wheel is arranged on a fixed axle that is coaxial with the motor shaft and has clutch members or projections adapted to be engaged by clutch members of a longitudinally movable coupling sleeve on the motor shaft.

The arrangement of the belt pulley on a fixed, i. e. non-rotary, pin or axle, instead of placing it on the shaft of the motor, has the advantage that the pulley is not liable to be carried round by friction between itself and the constantly rotating motor shaft. The novel arrangement is still further improved by combining with the longitudinally movable coupling sleeve an arresting device which normally locks the belt pulley against rotation but, when the rotating coupling sleeve is moved into engagement with the pulley, automatically releases the latter and conversely, when the coupling sleeve is disengaged from the pulley, immediately arrests the latter. Mechanisms of this kind are generally controlled mechanically or pneumatically. Electrically controlled clutch mechanisms are also known which are operated by an electromagnet. In these known arrangements the electromagnet is normally maintained energized so that an unnecessary consumption of energy takes place. These known mechanisms can only be operated by continuous current and are only adapted for predetermined nonfluctuating voltages. In the present invention the lever for throwing the coupling sleeve into and out of engagement is operated by an electromagnet and locked in the coupling position by a mechanical device. The electromagnet is switched on by a snap switch that only closes the circuit momentarily, it being unnecessary to maintain the electromagnet energized for the purpose of keeping the clutch mechanism in its position of engagement. A second electromagnet, which also only requires a momentary energizing current, is provided for disengaging the coupling. Further features of the invention will appear hereinafter.

The invention is illustrated in the drawing which shows the clutch mechanism, but in which the actual sound reproducing machine to be driven is not shown, as this is unnecessary for the proper understanding of the invention.

The machine to be driven is driven from a belt pulley $r$ or a toothed wheel or the like which imparts motion to the machine through a speed change gear. Power is derived from any suitable source such as an electro-motor $o$ which may be connected to a current supply in any desired manner. The shaft $w'$ driven by the motor is provided with a longitudinally movable splined coupling sleeve $e$. The ends of the coupling sleeve $e$ and of the pulley $r$ that face each other are provided with clutch members, $n'$ $n^2$ that enter into engagement when the clutch is thrown into its operative position. The belt pulley $r$ is arranged to rotate on a fixed axle or pin $d$ that is coaxial with the shaft $w'$. The coupling sleeve $e$ is shifted by a pivoted lever $h'$, which is normally retracted by a spring $f$. The lever $h'$ carries an armature $a$ adapted to be attracted by the coupling electro-magnet $m'$. The sleeve $e$ has an annular groove into which fits a roller $h$ mounted rotatably on the lever $h'$, the latter being fulcrumed at $g$. The bottom end of the lever $h'$ is bevelled and adapted to be seized by a catch $h^2$ when the coupling sleeve $e$ is in engagement with the driving pulley $r$. The pivoted catch $h^2$ has an armature $a^2$ and is normally retracted from the pole of the uncoupling magnet $m^2$ by a spring $f^2$. A rod $c$ is pivotally attached at $c'$ to the lever $h'$ and adapted to shift an arresting pin $z$ which is arranged to enter in to the path of a projection $p$ on the pulley $r$. The electro-magnets $m'$ $m^2$ are connected to leads $u$, $v$, which extend to a switch S, and to a common lead $x$ from a current supply. In the common lead from the current supply, which latter may be a battery or the local lighting or power circuit, there is preferably connected an iron resistance $w^2$ enclosed in a chamber filled with hydrogen. The circuits of the electro-magnets are closed by a snap switch S, which, as indicated by the broken lines, may be at some distance from the clutch mechanism. The snap switch S comprises a leaf-spring $b$ and two fixed contacts $k'$, $k^2$ arranged at opposite sides of a piece of insulating material $l$. When the switch $b$ is pressed down it is bent to such an extent by the successive contact with contact $k'$ and the projecting portion of the insulation L that when finally the bent switch clears the insulation L, it will snap past the contact $k^2$ without touching it. Similarly, when the switch $b$ is moved upwardly from its lowermost position, it will come into engagement with contact $k^2$ and the porjecting portion of insulation L, but will be bent to such an extent as to avoid contact with contact $k'$. The parts $k'$, $k^2$ and L are held stationary as by attaching them to the base plate $t'$ of the switch S in any suitable manner (not shown). The spring $b$ is connected by a lead $y$ to the other pole of the current supply. It is attached to a pedal $t$ that is restored to its normal position by a spring (not shown) when it is released. The switch S may, of course, be arranged to be operated by an elbow or hand instead of by foot. The plate $t$ may be adapted to any of these purposes.

The clutch mechanism operates in the following manner:

The shaft $w'$ is kept rotating at a constant speed by the motor $o$. When the talking machine, dictograph or telephonograph or the like, is to be started the pedal $t$ is depressed and the leaf-spring $b$ is thus caused to momentarily make contact with the contact member $k'$. This results in a momentary energization of the coupling magnet $m'$ in a circuit extending from the lead $y$ through the spring $b$, contact $k'$, magnet $m'$ to the return lead $x$. The magnet $m'$ pulls the lever $h'$ towards the left, thereby shifting the splined coupling sleeve $e$ so as to bring its coupling members $n^2$ into engagement with the coupling members $n'$ of the belt pulley $r$ which is thus immediately rotated at full speed. As the leaf-spring $b$ does not touch either of the contacts $k'$, $k^2$ when the pedal $t$ is fully depressed, the coupling magnet $m'$ is not maintained energized. The coupling sleeve is maintained in its coupling position by the catch $h^2$ which seizes the bottom end of the lever $h'$ when it is swung by the magnet $m'$ to the left. To release the coupling sleeve $e$ the magnet $m^2$ is energized. This magnet then attracts the armature $a^2$ and pulls the catch $h^2$ from the lever $h'$ so that the latter is pulled to the right by the spring $f$ and shifts back the coupling sleeve $e$, thus causing the clutch members $n^2$ to disengage from the clutch members $n'$. At the same time the rod $c$ is shifted so that the arresting pin $z$ is brought into the path of the projection $p$ and the belt pulley $r$, that drives the talking machine, is immediately stopped.

The electromagnet $m^2$ is energized when the pedal $t$ is released. The leaf-spring $b$, during its upward travel, wipes against the bottom contact $k^2$ and thus momentarily closes the circuit of the uncoupling magnet $m^2$. When the pedal is in its upmost position both magnets $m'$, $m^2$ are again deenergized. As the circuits of these magnets are only energized momentarily either a continuous current or alternating current may be employed.

I claim:—

1. Clutch mechanism for sound reproducing machines, comprising a rotating shaft, a fixed shaft coaxial with the rotating shaft, a driving wheel on the fixed shaft, a clutch having one member splined on the rotating shaft for sliding movement along the latter and having its companion member fixed to the driving wheel, a lever for operating the sliding clutch member, electro-magnetic means for operating the lever, a catch for holding the lever in its operative position, an arresting device for arresting the motion of the driving wheel, and means for automatically disengaging the arresting device from the driving wheel when the clutch couples the wheel with the rotating shaft.

2. Clutch mechanism for sound reproducing machines, comprising a rotating shaft, a fixed shaft coaxial with the rotating shaft, a driving wheel on the fixed shaft, a clutch member splined on the rotating shaft for coupling the latter to clutch means on the driving wheel, a lever for operating the clutch member, electro-magnetic means for operating the lever, a catch for holding the lever in its operative position, means for operating said catch to release said lever, an arresting device for arresting the motion of the driving wheel, and means for automatically disengaging the arresting device from the driving wheel when the clutch member couples the wheel with the rotating shaft.

3. Clutch mechanism for sound reproducing machines comprising a rotating shaft, a fixed shaft coaxial with the rotating shaft, a driving wheel on the fixed shaft, a clutch member splined on the rotating shaft for coupling the latter to clutch means on the driving wheel, a lever for operating the clutch member, a magnet for operating the lever, a catch for holding the lever in its operative position, a magnet for operating said catch to release said lever, an arresting device for arresting the motion of the driving wheel, means for automatically disengaging the arresting device from the driving wheel when the clutch member couples the wheel with the rotating shaft, separate energizing circuits for said magnets, and a switch for transitorily closing at each operation of the switch the one or other of said circuits.

4. Clutch mechanism for sound reproducing machines, comprising a rotating shaft, a fixed shaft coaxial with the rotating shaft, a driving wheel on the fixed shaft, a clutch means including a member splined on the rotating shaft for coupling the latter to the driving wheel, a lever for operating the clutch member, an electro-magnet for operating the lever, a catch for holding the lever in its operative position, an electromagnet for operating said catch to release said lever, an arresting device for arresting the motion of the driving wheel, means for automatically disengaging the arresting device from the driving wheel when the clutch member couples the wheel with the rotating shaft, separate energizing circuits for said magnets, a current supply, and a switch for transitorily closing at each operation of the switch the one or other of said circuits, said switch consisting of a movable metallic member connected to one pole of said current supply, two fixed contacts each connected in circuit through one of said magnets to the other pole of said current supply, means for establishing a fleeting contact between said metallic member and a said fixed contact, and a piece of insulation between the fixed contacts which prevents the metallic member when operated in any one direction from contacting with the second fixed contact after it has contacted with the first fixed contact.

5. Clutch mechanism for sound reproducing machines comprising a revolvable shaft, a clutch member splined on said shaft, a fixed axle spaced from and coaxial with said revolvable shaft, a wheel rotatable on said fixed axle, means on said wheel cooperating with said clutch member, means for actuating the clutch member into and out of engagement with its cooperating means on the wheel, means for releasably holding said actuating means in clutch engaging position, an electromagnet controlling said actuating means, a second electromagnet controlling said holding means, a selective switch having a yielding switch arm and a pair of fixed contacts, a common connection from the switch arm to both electromagnets, connections between the respective electromagnets and contacts, said switch arm being arranged to momentarily close the circuits through the respective contacts when moving in opposite directions.

6. Clutch mechanism for sound reproducing machines comprising a revolvable shaft, a clutch member splined on said shaft, a fixed axle spaced from and coaxial with said revolvable shaft, a wheel rotatable on said fixed axle, a clutch member fixed on said wheel and cooperating with said first-named clutch member, spring pressed means for normally maintaining said clutch member out of engagement, electro-magnetic means for moving the splined clutch member into engagement with the clutch member on the wheel, and releasable locking means for retaining said clutch members in engagement when the said electromagnetic means is inoperative.

7. A clutch mechanism including a drive shaft, a clutch member splined thereon, a spindle, a rotatable pulley mounted on said spindle in axial alignment with said shaft, a clutch member secured to said pulley, means for normally maintaining the clutch members out of engagement and the pulley locked against rotation, a latch coacting with said means, electro-magnetic means adapted when energized to cause said means to move the splined clutch member into engagement with its companion member and to simultaneously release the pulley for rotation, a second electro-magnetic means adapted when energized to move said latch to disengaging position, electrical connections for both said electro-magnetic means, and a switch in said connections for energizing both said electromagnetic means in a predetermined sequence.

In testimony whereof I have affixed my signature.

WILHELM GROENEBAUM.